UNITED STATES PATENT OFFICE.

HEDWIG HERZFELD AND OTTO HAUSER, OF BERLIN, GERMANY.

PROCESS OF MANUFACTURING ARTIFICIAL FERTILIZER.

1,125,318. Specification of Letters Patent. Patented Jan. 19, 1915.

No Drawing. Application filed September 11, 1913. Serial No. 789,333.

*To all whom it may concern:*

Be it known that we, HEDWIG HERZFELD and OTTO HAUSER, subjects of Emperor William II of Germany, and residing at Berlin, in the Empire of Germany, have invented new and useful Improvements in Processes of Manufacturing Artificial Fertilizer, of which the following is a specification.

Our invention relates to processes of manufacturing artificial fertilizer.

It has been attempted for a long time to use silicates with high contents of potash as potash fertilizer, but without the required success. The difficulty with the combination is that the alkali portions of the minerals are very slowly freed by reason of the influences of atmospheric precipitations; that is: the potassium content of these silicates is bound so intensely in them that it will free very slowly by effervescence. Consequently, the effect of the fertilizer is very slight compared with the effect of fertilizer having therein chlorid of potassium or natural potassic salts.

The object of our invention is to increase the fertilizing value of potassic minerals or silicates containing potassium by mixing them in a powdered state with solutions of magnesium salt or other solutions of alkaline earths, and thereby produce a very cheap and highly useful fertilizer.

We accomplish our invention in a very satisfactory manner by thoroughly stirring and mixing a nephelin-leucitite mineral, such as phonolite tuff, which contains oxid of potassium $K_2O$, with a solution of earth alkali, such as end lye. We have found that by thoroughly mixing four parts of the mineral in a finely divided state with one part of end lye, which is the mother lye which remains in the production of chlorid of potassium of carnallite $$(MgCl_2 KCl 6H_2O),$$

and contains per liter

| | | |
|---|---|---|
| $MgCl_2$ | 332.02 | grams. |
| $MgSO_4$ | 23.41 | " |
| KCl | 16.10 | " |
| NaCl | 14.96 | " |
| $CaCl_2$ | Trace | | and is of little or no commercial value, then slowly raising the temperature of the mixture to about 300° centigrade and then maintaining said temperature for about 5 to 15 hours, the resultant product is a highly efficient fertilizer which is composed of very cheap materials. The silicate is transformed by the end lye, during the process, into a solid paste. The potassium salts are absorbed by the silicate and are loosely held therein so that they are washed out of the product by degrees only and have an immediate effect upon the soil. Violent rainfall has practically no effect upon it.

By the term "end lye" in the claims we refer to the mother lye which remains in the production of chlorid or potassium of carnallite.

What we claim is:

1. The process of manufacturing artificial fertilizer which consists in mixing four parts of a mineral containing potassium with one part of end lye and applying heat to the mixture.

2. The process of manufacturing artificial fertilizer which consists in mixing four parts of a finely divided mineral containing potassium with one part of end lye solution, then slowly raising the temperature of the mixture to 150° centigrade and subjecting the mixture to said temperature from five to fifteen hours.

In witness whereof we have hereunto signed our names in the presence of two witnesses.

HEDWIG HERZFELD.
OTTO HAUSER.

Witnesses:
OTTO RASCHE,
RICHARD GROTHE.